US011594936B2

(12) United States Patent
Shimizu

(10) Patent No.: US 11,594,936 B2
(45) Date of Patent: Feb. 28, 2023

(54) ELECTRIC ACTUATOR

(71) Applicant: NTN CORPORATION, Osaka (JP)

(72) Inventor: Tatsunori Shimizu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 744 days.

(21) Appl. No.: 16/343,044

(22) PCT Filed: Oct. 24, 2017

(86) PCT No.: PCT/JP2017/038331
§ 371 (c)(1),
(2) Date: Apr. 18, 2019

(87) PCT Pub. No.: WO2018/079540
PCT Pub. Date: May 3, 2018

(65) Prior Publication Data
US 2020/0052550 A1 Feb. 13, 2020

(30) Foreign Application Priority Data
Oct. 31, 2016 (JP) .............................. JP2016-213129

(51) Int. Cl.
H02K 7/06 (2006.01)
H02K 7/116 (2006.01)
F16H 25/18 (2006.01)

(52) U.S. Cl.
CPC ............... H02K 7/06 (2013.01); F16H 25/18 (2013.01); H02K 7/116 (2013.01)

(58) Field of Classification Search
CPC ............. H02K 7/06; H02K 7/116; F16H 5/18
See application file for complete search history.

(56) References Cited

U.S. PATENT DOCUMENTS

| 2019/0092399 | A1* | 3/2019 | Matsuto | H02K 7/06 |
| 2019/0264788 | A1* | 8/2019 | Shimizu | F16H 25/2204 |
| 2021/0234421 | A1* | 7/2021 | Naitou | H02K 1/278 |

FOREIGN PATENT DOCUMENTS

| JP | 2000-120810 | 4/2000 |
| JP | 2007-46637 | 2/2007 |

(Continued)

OTHER PUBLICATIONS

Machine Translation of JP-2000120810-A, Shibata, Toru (Year: 2000).*

(Continued)

Primary Examiner — Bernard Rojas
(74) Attorney, Agent, or Firm — Wenderoth, Lind & Ponack, L.L.P.

(57) ABSTRACT

Provided is an electric actuator, including: a driving motor (2); a motion conversion mechanism (6) configured to convert a rotary motion of the driving motor (2) to a linear motion; a transmission gear mechanism (5) configured to transmit a driving force from the driving motor (2) to the motion conversion mechanism (6); and a speed reduction mechanism (3) configured to reduce a speed of the rotary motion of the driving motor (2), and output the rotary motion reduced in speed to the transmission gear mechanism (5), wherein a side of one end portion of a rotation shaft (18) of a gear (16) of the transmission gear mechanism (5) is rotatably supported by a bearing (19), and a side of another end portion of the rotation shaft (18) of the gear (16) is rotatably supported by the output shaft (2a) of the driving motor (2).

3 Claims, 8 Drawing Sheets

(56) References Cited

FOREIGN PATENT DOCUMENTS

| JP | 2008-116037 | 5/2008 |
| JP | 2009-243489 | 10/2009 |
| JP | 2011-047448 | 3/2011 |
| JP | 2012-67771 | 4/2012 |

OTHER PUBLICATIONS

International Search Report dated Dec. 5, 2017 in International (PCT) Application No. PCT/JP2017/038331.
International Preliminary Report on Patentability and Written Opinion of the International Searching Authority dated Apr. 30, 2019 in International (PCT) Application No. PCT/JP2017/038331.
Extended European Search Report dated May 6, 2020 in corresponding European Patent Application No. 17866229.2.

* cited by examiner

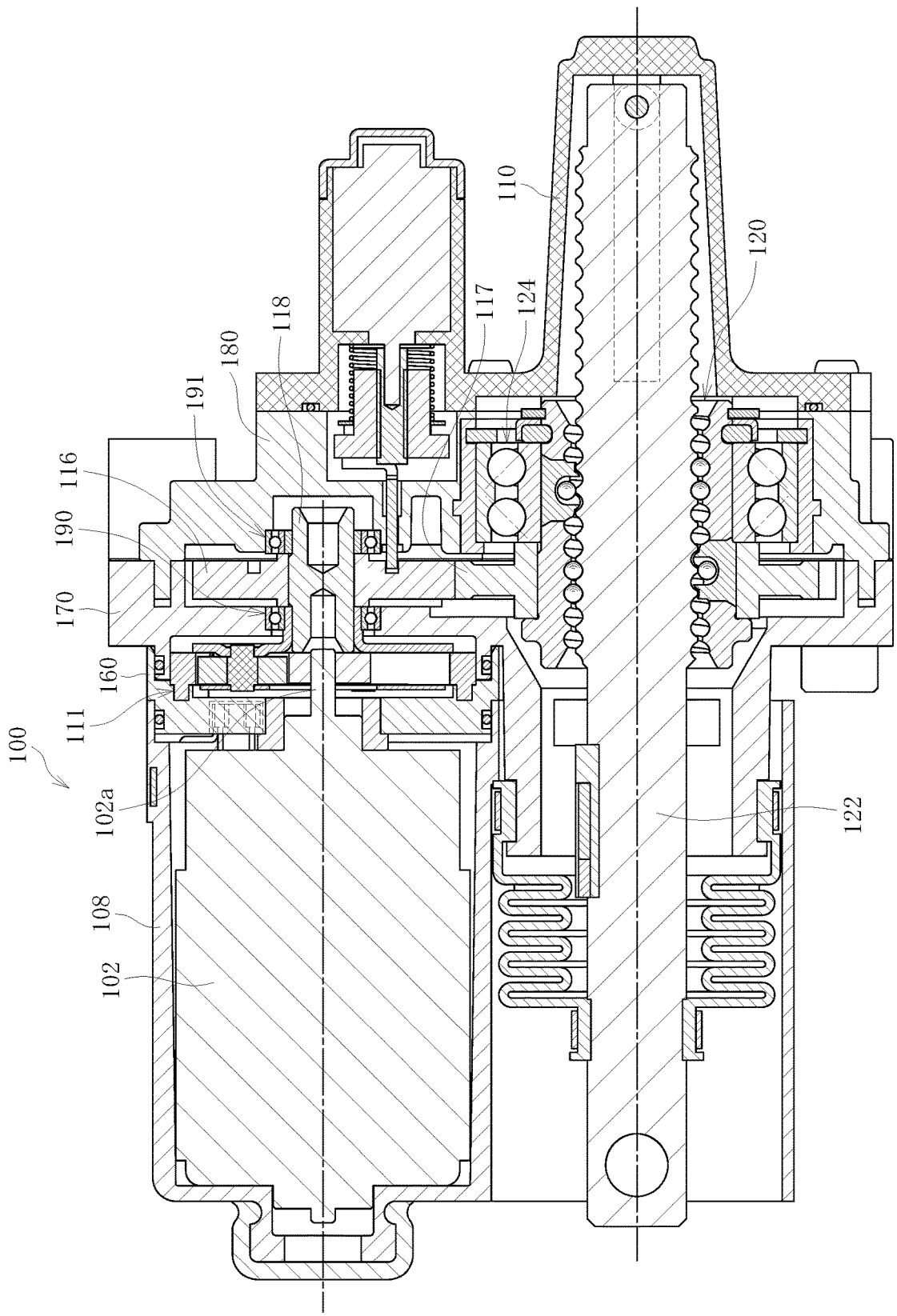

ELECTRIC ACTUATOR

TECHNICAL FIELD

The present invention relates to an electric actuator.

BACKGROUND ART

In recent years, electrification of automobiles and the like has been promoted for power saving and reduction in fuel consumption. For example, a system for operating an automatic transmission, a brake, a steering wheel, and the like of the automobile with use of power of an electric motor has been developed and brought to the market. As an electric actuator for use in such an application, there has been known an electric linear actuator employing a ball screw mechanism configured to convert a rotary motion of a motor into a motion in a linear direction.

For example, in Patent Literature 1, there is proposed an electric linear actuator configured to transmit a driving force from an electric motor to a ball screw mechanism thorough a plurality of gears.

CITATION LIST

Patent Literature 1: JP 2007-46637 A

SUMMARY OF INVENTION

Technical Problem

Incidentally, in order to efficiently transmit the driving force of the electric motor to the ball screw mechanism, a meshing state among gears configured to transmit the driving force needs to be precisely maintained. Therefore, the gear is generally supported on both sides of end portions by two bearings so as to prevent whirling of a shaft from occurring.

However, the configuration of using the two bearings to support the gear has such a problem that the number of components increases, and a size in an axial direction also increases.

Therefore, the present invention has an object to provide an electric actuator capable of reducing the number of components, and achieving downsizing.

Solution to Problem

As a technical measure to attain the above-mentioned object, according to one embodiment of the present invention, there is provided an electric actuator, comprising: a driving motor; a motion conversion mechanism configured to convert a rotary motion of the driving motor to a linear motion in an axial direction parallel with an output shaft of the driving motor; a transmission gear mechanism configured to transmit a driving force from the driving motor to the motion conversion mechanism; and a speed reduction mechanism configured to reduce a speed of the rotary motion of the driving motor, and output the rotary motion reduced in speed to the transmission gear mechanism, wherein a side of one end portion of a rotation shaft of a gear of the transmission gear mechanism is rotatably supported by a bearing, and a side of another end portion of the rotation shaft of the gear is rotatably supported by the output shaft of the driving motor.

One of the bearings can be omitted through rotatably supporting one side of the end portions of the rotation shaft by the output shaft of the driving motor in such a manner. As a result, the number of the components is reduced, a cost can thus be reduced, and the downsizing in the axial direction of the electric actuator can also be achieved.

As the speed reduction mechanism, it is possible to employ a planetary-gear speed reduction mechanism, comprising: a sun gear integrally mounted to the output shaft of the driving motor; a ring gear arranged on an outer peripheral side of the sun gear; a plurality of planetary gears, which are arranged between the sun gear and the ring gear, and are configured to mesh with the sun gear and the ring gear; and a planetary gear carrier, which is configured to rotatably hold the plurality of planetary gears, and is integrally mounted to the rotation shaft of the gear of the transmission gear mechanism. In this case, the side of the another end portion of the gear can be rotatably supported by the output shaft of the driving motor through allowing the output shaft of the driving motor to pass through the sun gear of the planetary-gear speed reduction mechanism, and inserting a side of a distal end portion of the output shaft into a shaft hole formed in the rotation shaft of the gear so as to be capable of relatively rotating.

Moreover, through mounting the driving motor to an actuator case to which the bearing is mounted, both the bearing configured to support the side of the one end portion of the gear and the driving motor configured to support the side of the another end portion of the gear are mounted to the same case (actuator case), and a precision in a relative position between the output shaft and the bearing increases. That is, the driving motor and the bearing are not mounted to separate cases, and the relative position between the driving motor and the bearing is thus not influenced by a precision in assembling the cases to one another. As a result, precisions in position and posture of the gear supported by the driving motor and the bearing increase.

Further, a precision in relative position among the speed reduction mechanism, the driving motor, and the bearing can be increased through mounting the speed reduction mechanism together with the driving motor to the actuator case, and the precisions in position and posture of the gear can thus be increased.

Advantageous Effects of Invention

According to the present invention, one of the two bearings configured to support the gear can be omitted, the number of components thus decreases, and the cost reduction and the downsizing of the electric actuator can be achieved.

BRIEF DESCRIPTION OF DRAWINGS

FIG. 8 is a vertical sectional view of the electric actuator according to a comparative example.

DESCRIPTION OF EMBODIMENTS

Now, description is made of the present invention with reference to the accompanying drawings. In the respective drawings for illustrating the present invention, components such as members and component parts having the same functions or shapes are denoted by the same reference symbols as long as the components can be distinguished, and description thereof is therefore omitted after the description is made once.

Figure 1:
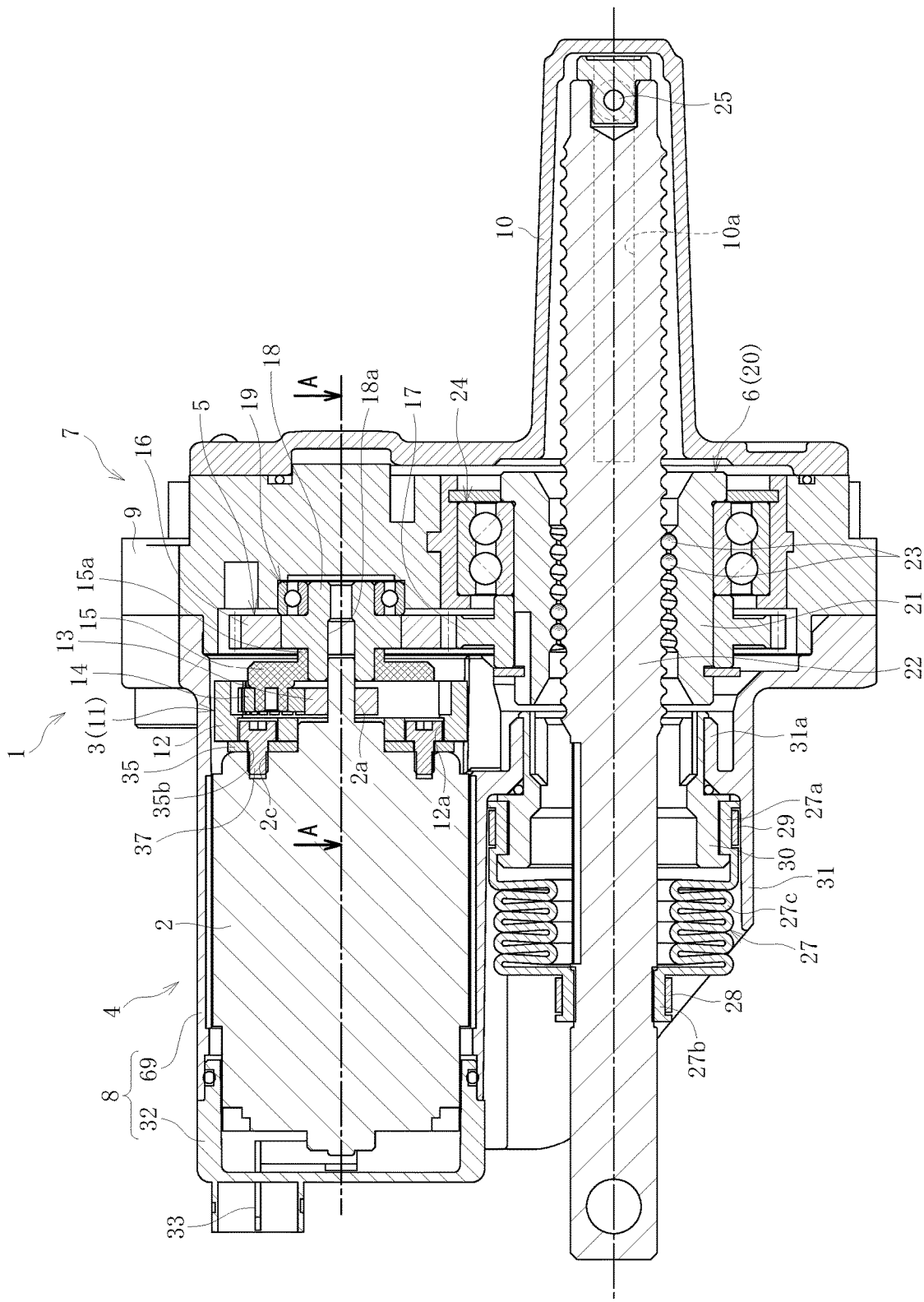
FIG. 1 is a vertical sectional view of an electric actuator according to one embodiment of the present invention.
Figure 2:
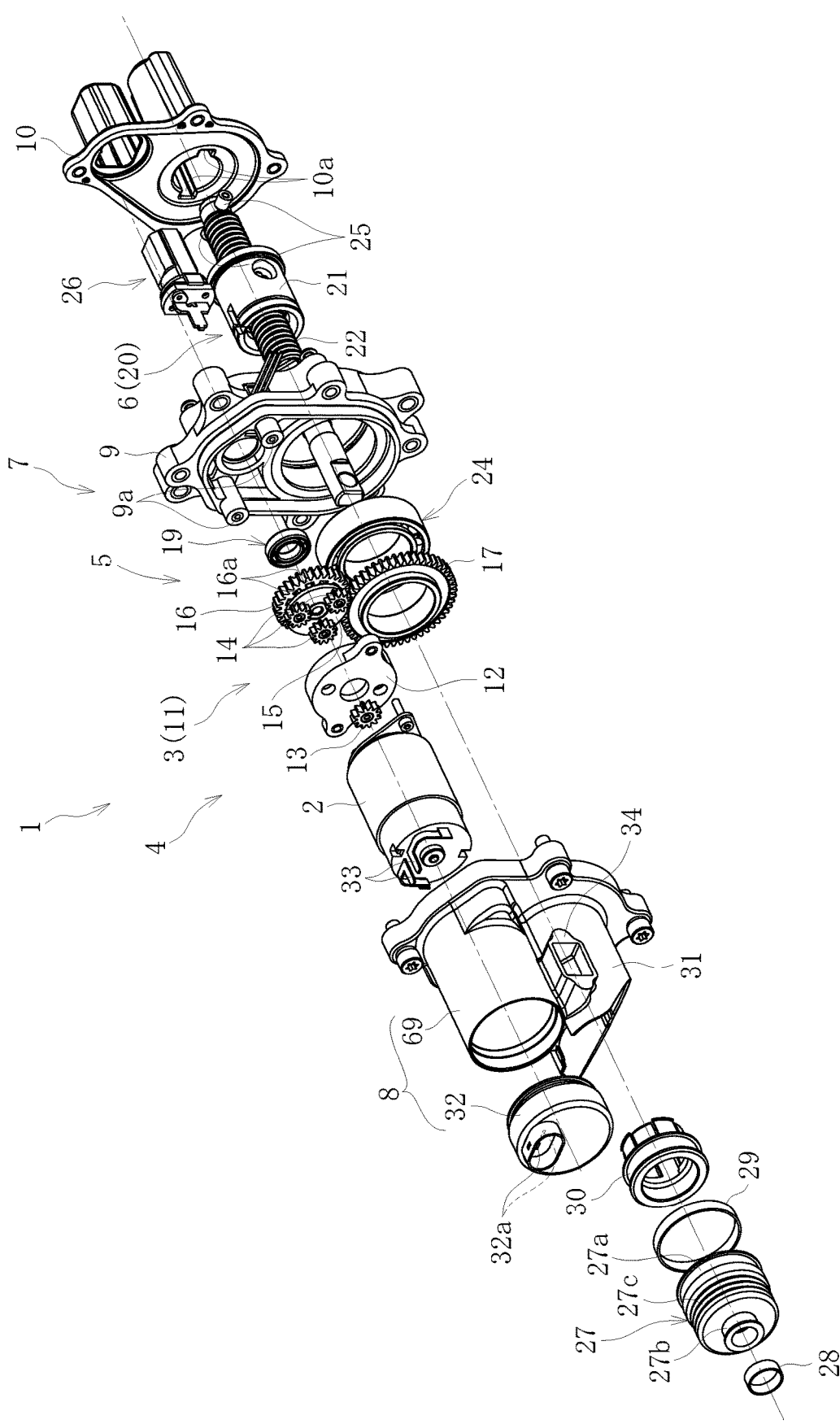
FIG. 2 is an exploded perspective view of the electric actuator.

FIG. 1 is a vertical sectional view of an electric actuator according to one embodiment of the present invention. FIG. 2 is an exploded perspective view of the electric actuator.

As illustrated in FIG. 1 and FIG. 2, the electric actuator 1 according to this embodiment mainly comprises a motor section 4 and a drive transmission/conversion section 7. The motor section 4 comprises a driving motor 2 and a speed reduction mechanism 3. The drive transmission/conversion section 7 comprises a transmission gear mechanism 5 and a motion conversion mechanism 6. As described later, it is not always required that the motor section 4 comprise the speed reduction mechanism 3.

The sections forming the electric actuator 1 comprise respective exterior cases. Components are accommodated or supported in the respective exterior cases. Specifically, the motor section 4 comprises a motor case 8 configured to accommodate the driving motor 2 and the speed reduction mechanism 3. The drive transmission/conversion section 7 comprises an actuator case 9 configured to support the transmission gear mechanism 5 and the motion conversion mechanism 6. Moreover, the motor case 8 comprises a motor-case main body 69 and a cap member 32. The motor-case main body 69 is configured to accommodate the driving motor 2. The cap member 32 is formed independently of the motor-case main body 69. The motor-case main body 69 is mounted to the actuator case 9 so as to be coupled and decoupled in an axial direction of the driving motor 2. The driving motor 2 and the speed reduction mechanism 3 are also mounted to the actuator case 9 so as to be coupled and decoupled in the axial direction. Further, a shaft case 10 configured to accommodate apart of the motion conversion mechanism 6 is mounted to the actuator case 9 on an opposite side of a motor case 8 side so as to be coupled and decoupled in the axial direction. These exterior cases are assembled to one another through fastening with bolts. Now, description is made of detailed configurations of the respective parts forming the electric actuator 1.

Figure 3:
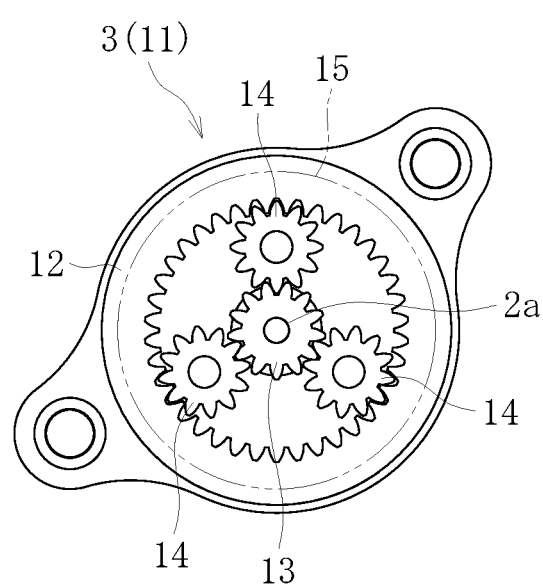
FIG. 3 is a view of a planetary-gear speed reduction mechanism as seen in an axial direction.

FIG. 3 is a view of the speed reduction mechanism as seen in the axial direction.

The speed reduction mechanism 3 comprises a planetary-gear speed reduction mechanism 11 formed of a plurality of gears and the like. As illustrated in FIG. 3, the planetary-gear speed reduction mechanism 11 is formed of a ring gear 12, a sun gear 13, a plurality of planetary gears 14, and a planetary gear carrier 15.

The sun gear 13 is arranged at the center of the ring gear 12. An output shaft 2a of the driving motor 2 is press-fitted to the sun gear 13. Moreover, the respective planetary gears 14 are arranged between the ring gear 12 and the sun gear 13 so as to mesh with the ring gear 12 and the sun gear 13. The respective planetary gears 14 are rotatably held by the planetary gear carrier 15.

In the planetary-gear speed reduction mechanism 11, when the driving motor 2 performs the rotational drive, the sun gear 13 integrally mounted to the output shaft 2a of the driving motor 2 rotates, and, along with this rotation, the respective planetary gears 14 revolve along the ring gear 12 while rotating. Then, the planetary gear carrier 15 is rotated by the revolution motion of the planetary gears 14. With this, the speed of the rotation of the driving motor 2 is reduced, the rotation reduced in speed is transmitted, and a rotation torque increases. Through the transmission of the driving force via the planetary-gear speed reduction mechanism 11 in such a manner, a high output of the electric actuator 1 is thus obtained, and downsizing of the driving motor 2 can thus be achieved. In this embodiment, although an inexpensive (brush) DC motor is used as the driving motor 2, other motor such as a brushless motor may be used.

Next, as illustrated in FIG. 1 and FIG. 2, the transmission gear mechanism 5 is formed of a drive gear 16 and a driven gear 17. The drive gear 16 has a small diameter, and serves as a first gear with a rotation shaft arranged coaxially with the output shaft 2a of the driving motor 2. The driven gear 17 has a large diameter, and serves as a second gear which meshes with the drive gear 16. A gear boss 18 (see FIG. 1) serving as a rotation shaft is press-fitted to a rotation center portion of the drive gear 16. One end portion (right end portion in FIG. 1) of the gear boss 18 is rotatably supported by a rolling bearing 19 mounted to the actuator case 9. The drive gear 16 and the gear boss 18 may be integrally formed through sintering. Meanwhile, an end portion (left end portion in FIG. 1) of the gear boss on an opposite side is supported through insertion of the output shaft 2a of the driving motor 2, which passes through the sun gear 13, into a shaft hole 18a opened on a side of this end portion. That is, the output shaft 2a of the driving motor 2 is inserted into the gear boss 18 so as to constitute a relationship of a slide bearing rotatable relatively to the gear boss 18. Moreover, lubricant such as grease may be filled in the shaft hole 18a of the gear boss 18 so that the output shaft 2a of the driving motor 2 and the gear boss 18 can smoothly rotate relatively to each other. When the gear boss 18 is made of sintered alloy, and is further formed integrally with the drive gear 16, the sintered material holds lubricant, which makes the gear boss 18 be suitable as a slide bearing.

The gear boss 18 is so mounted to the planetary gear carrier 15 as to integrally rotate. In detail, the planetary gear carrier 15 has a cylindrical portion 15a (see FIG. 1) at a center portion thereof, and the cylindrical portion 15a is press-fitted over an outer peripheral surface of the gear boss 18. The planetary gear carrier 15 may be made of resin, and the gear boss 18 may be molded integrally with the planetary gear carrier 15 by insert molding. As a result, when the driving motor 2 performs rotary drive, and the planetary gear carrier 15 rotates accordingly, the drive gear 16 rotates integrally with the planetary gear carrier 15, and the driven gear 17 thus rotates. This embodiment is so configured that the rotation is reduced in speed (increased in torque) from the drive gear 16 having a small diameter to the driven gear 17 having a large diameter, but the rotation may be transmitted at a constant speed from the drive gear 16 to the driven gear 17.

Now, description is made of the motion conversion mechanism.

The motion conversion mechanism 6 is formed of a ball screw 20 arranged on an axis parallel with the output shaft 2a of the driving motor 2. The motion conversion mechanism 6 is not limited to the ball screw 20, and may be a lead screw device. However, in terms of reducing the rotation torque and downsizing the driving motor 2, the ball screw 20 is more preferred.

The ball screw 20 comprises a ball screw nut 21, a ball screw shaft 22, a large number of balls 23, and a circulation member (not shown). Spiral grooves are formed in each of an inner peripheral surface of the ball screw nut 21 and an outer peripheral surface of the ball screw shaft 22. Two rows of the balls 23 are received between both of the spiral grooves.

The ball screw nut 21 is rotatably supported by the double-row bearing 24 mounted to the actuator case 9. The double-row bearing 24 is fixed through press-fit on a rear end side (right side of FIG. 1) of the ball screw shaft 22 with respect to a portion on the outer peripheral surface of the ball screw nut 21 to which the driven gear 17 is fixed. Meanwhile, a rotation of the ball screw shaft 22 is restricted through insertion of a pin 25 serving as a rotation restriction member provided on a rear end portion (right end portion in FIG. 1) of the ball screw shaft 22 into guide grooves 10a in an axial direction formed in an inner peripheral surface of the shaft case 10.

When the ball screw nut 21 rotates, the plurality of balls 23 accordingly circulate through the circulation member while moving along the spiral grooves, and the ball screw shaft 22 advances/retreats along the guide grooves 10a of the shaft case 10. The rotary motion from the driving motor 2 is converted to a linear motion in the axial direction parallel with the output shaft 2a of the driving motor 2 through the advance/retreat of the ball screw shaft 22 in such a manner. A distal end portion (left end portion in FIG. 1) of the ball screw shaft 22 in the advance direction functions as an operation part (actuator head) configured to operate a device of an object to be operated. FIG. 1 is a view for illustrating a state in which the ball screw shaft 22 is arranged at an initial position when the ball screw shaft 22 retreats most toward the right side in FIG. 1.

Moreover, the electric actuator 1 according to this embodiment comprises a lock mechanism 26 (see FIG. 2) configured to prevent an unintended advance/retreat of the ball screw shaft 22. The lock mechanism 26 is mounted to the shaft case 10, and is configured to be capable of engaging with/disengaging from a plurality of engagement holes 16a (see FIG. 2) formed over the drive gear 16 in a circumferential direction. Even when an external force is input from a side of the object to be operated to a side of the ball screw shaft 22, an unintended advance/retreat of the ball screw shaft 22 is prevented, and a position of the ball screw shaft 22 in an advance/retreat direction can be maintained at a predetermined position by the lock mechanism 26 engaging with one of the engagement holes 16a, to thereby restrict the rotation of the drive gear 16. The configuration comprising such a lock mechanism 26 is particularly preferred for a case in which the electric actuator is applied to an application that requires maintenance of a position.

A boot 27 configured to prevent entry of foreign substances into the ball screw nut 21 is mounted on a distal end portion side of the ball screw shaft 22. The boot 27 is formed of a large-diameter end portion 27a, a small-diameter end portion 27b, and a bellows 27c. The bellows 27c is configured to connect the large-diameter end portion 27a and the small-diameter end portion 27b to each other, and extend/contract in the axial direction. The small-diameter end portion 27b is fixed to an outer peripheral surface of the ball screw shaft 22 through tightening a boot band 28. The large-diameter end portion 27a of the boot 27 is fixed to an outer peripheral surface of a boot mounting member 30 having a cylindrical shape mounted to the motor-case main body 69 through tightening a boot band 29.

Moreover, a boot cover 31 having a cylindrical shape configured to protect the boot 27 is provided on an outer side of the boot 27. A cylindrical mounting part 31a (see FIG. 1) is provided on an inner side of the boot cover 31. The boot mounting member 30 is mounted to the mounting part 31a. Both the boot cover 31 and the mounting part 31a are provided integrally with the motor-case main body 69.

Moreover, the cap member 32 is mounted to the motor-case main body 69 on an opposite side of an actuator case 9 side. An insertion hole 32a (see FIG. 2) configured to insert a bus bar 33 configured to supply power from a power source (not shown) to the driving motor 2 is formed in the cap member 32. Further, a sensor case 34 (see FIG. 2) configured to accommodate a stroke sensor configured to detect a stroke of the ball screw shaft 22 is provided integrally on the outer peripheral surface of the motor-case main body 69.

Figure 4:
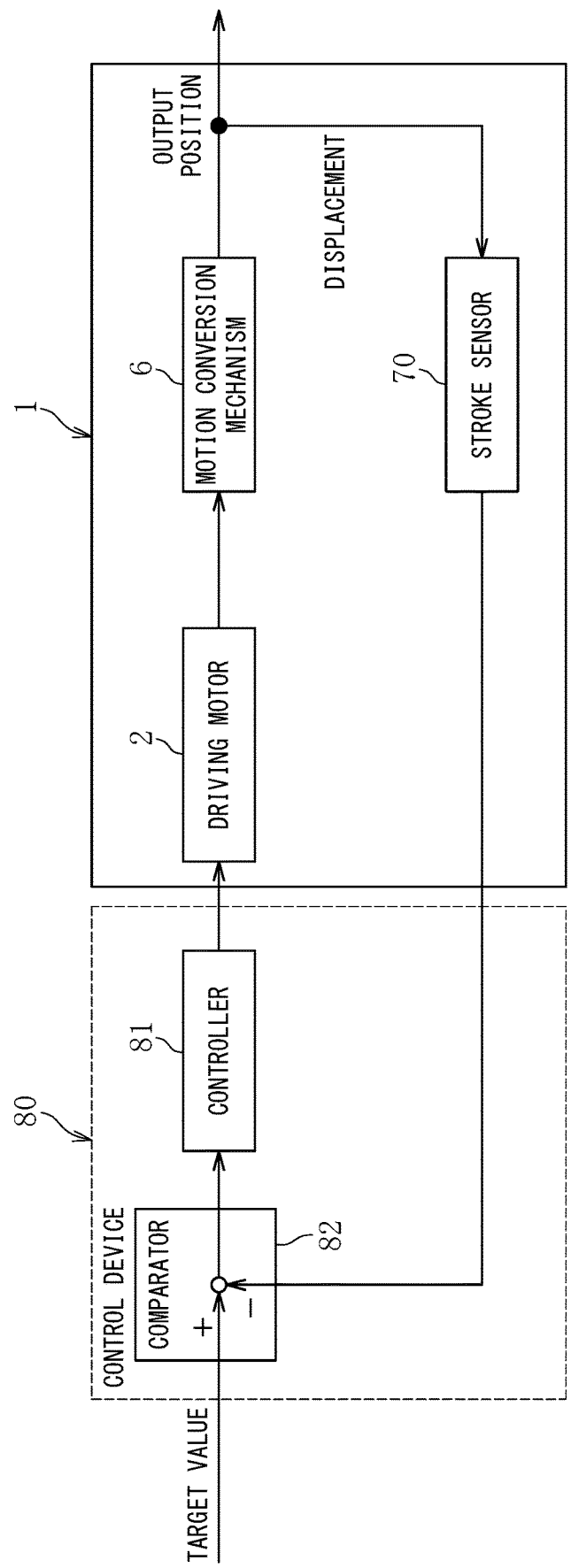
FIG. 4 is a control block diagram of the electric actuator.

Next, with reference to FIG. 4, description is made of feedback control for the electric actuator using the stroke sensor.

As illustrated in FIG. 4, when a target value is transmitted to a control device 80, a control signal is transmitted from a controller 81 of the control device 80 to the driving motor 2. The target value is, for example, a stroke value calculated by an ECU provided at an upper position of a vehicle based on an operation amount when the operation amount is input to the ECU.

When the driving motor 2 receives the control signal, the driving motor 2 starts the rotational drive, and the driving force thereof is transmitted to the ball screw shaft 22 through intermediation of the planetary-gear speed reduction mechanism 11, the drive gear 16, the driven gear 17, and the ball screw nut 21, and the ball screw shaft 22 thus advances. With this, the object device to be operated arranged on the distal endportion side (actuator head side) of the ball screw shaft 22 is operated.

At this time, the stroke value (position in the axial direction) of the ball screw shaft 22 is detected by the stroke sensor 70. The detection value detected by the stroke sensor 70 is transmitted to a comparison portion 82 of the control device 80, and a difference between the detection value and the target value is calculated. Then, the driving motor 2 is driven until the detection value matches the target value. When the electric actuator 1 of this embodiment is applied to, for example, a shift-by-wire system, a shift position can reliably be controlled by feeding back the stroke value detected by the stroke sensor 70 to control the position of the ball screw shaft 22 in such a manner.

Figure 5:
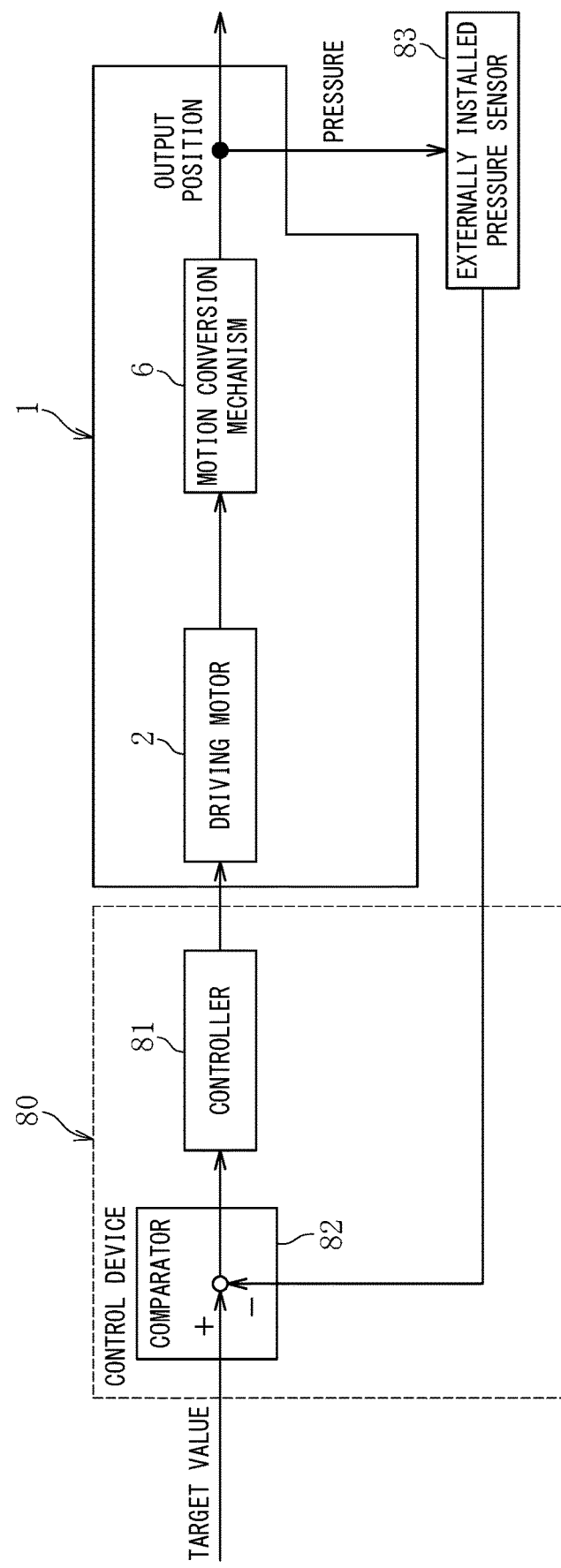
FIG. 5 is a control block diagram of the electric actuator.

Next, with reference to FIG. 5, description is made of feedback control in a case in which a pressure sensor 83 is used in place of the stroke sensor 70.

As illustrated in FIG. 5, in this case, the pressure sensor 83 is provided for the object device to be operated. When the operation amount is input to the ECU provided at the upper position of the vehicle, the ECU calculates a required target value (pressure command value). When the target value is transmitted to the control device 80, and the control signal is transmitted from the controller 81 to the driving motor 2, the driving motor 2 starts the rotational drive. With this, the ball screw shaft 22 advances, and the object device to be operated arranged on the distal endportion side (actuator head side) of the ball screw shaft 22 is operated to pressurize.

An operation pressure of the ball screw shaft 22 at this time is detected by the pressure sensor 83, and the position of the ball screw shaft 22 is subjected to the feedback control based on the detection value and the target value as in the case of the use of the stroke sensor 70. When the electric actuator 1 of this embodiment is applied to, for example, a brake-by-wire system, a hydraulic pressure of a brake can reliably be controlled by feeding back the pressure value detected by the pressure sensor 83 to control the position of the ball screw shaft 22 in such a manner.

Description is now made of a configuration of an electric actuator according to a comparative example other than the present invention.

An electric actuator 100 according to the comparative example illustrated in FIG. 8 comprises a driving motor 102, a planetary-gear speed reduction mechanism 111, a drive gear 116, a driven gear 117, and a ball screw 120 as in the embodiment of the present invention. The planetary-gear speed reduction mechanism 111 serves as the speed reduction mechanism. The drive gear 116 and the driven gear 117 serve as the transmission gear mechanism. The ball screw 120 serves as the motion conversion mechanism. The electric actuator 100 is particularly different from the electric actuator according to the embodiment of the present invention in a configuration that supports the drive gear 116.

Specifically, the drive gear 116 is rotatably supported by two rolling bearings 190 and 191 arranged on both sides of end portions of a gear boss 118, which is a rotation shaft of the drive gear 116. Detailed description is now made of the comparative example. Cases forming an exterior portion of the electric actuator 100 comprise a motor case 108, a speed-reduction-gear case 160, a transmission gear case 170, a bearing case 180, and a shaft case 110 in this order from the left side of FIG. 8. The motor case 108 is configured to accommodate the driving motor 102. The speed-reduction-gear case 160 is configured to accommodate the planetary-gear speed reduction mechanism 111. The transmission gear case 170 is configured to accommodate the drive gear 116 and the driven gear 117. The bearing case 180 is configured to accommodate a double-row bearing 124 configured to support the ball screw 120. The shaft case 110 is configured to accommodate a rear-end-portion side of a ball screw shaft 122. Each of the cases is fastened to the adjacent cases with bolts. Then, the one rolling bearing 190 is mounted to the transmission gear case 170. The another rolling bearing 191 is mounted to the bearing case 180.

Compared to the comparative example, in the electric actuator 1 according to the embodiment of the present invention, only one rolling bearing (only the rolling bearing 19) is provided to support the gear boss 18. The another rolling bearing (the rolling bearing 190 on the left side of FIG. 8 in the comparative example) is omitted. Therefore, the side of the end portion of the gear boss 18 on which the rolling bearing is omitted is rotatably supported by the output shaft 2*a* of the driving motor 2. In such a manner, in this embodiment, one of the bearings configured to support the drive gear 16 is omitted through rotatably supporting the side of the one end portion of the gear boss 18 by the output shaft 2*a* of the driving motor 2. As a result, the number of components is reduced compared to the comparative example, a cost can thus be reduced, and the downsizing in the axial direction of the electric actuator can also be achieved.

Further, in this embodiment, both the driving motor 2 configured to support the drive gear 16 and the rolling bearing 19 configured to support the drive gear 16 are mounted to the same case (actuator case 9), and a precision of a relative position between the output shaft 2*a* of the driving motor 2 and the rolling bearing 19 increases. That is, when the driving motor 2 and the rolling bearing 19 are mounted to separate cases, an assembling precision when these cases are assembled influences the relative positional relationship between the driving motor 2 and the rolling bearing 19. However, in this embodiment, the relative position between the driving motor 2 and the rolling bearing 19 is not influenced by the assembling precision among the cases. As a result, precisions in position and posture of the drive gear 16 supported by the driving motor 2 and the rolling bearing 19 increase.

Figure 6:
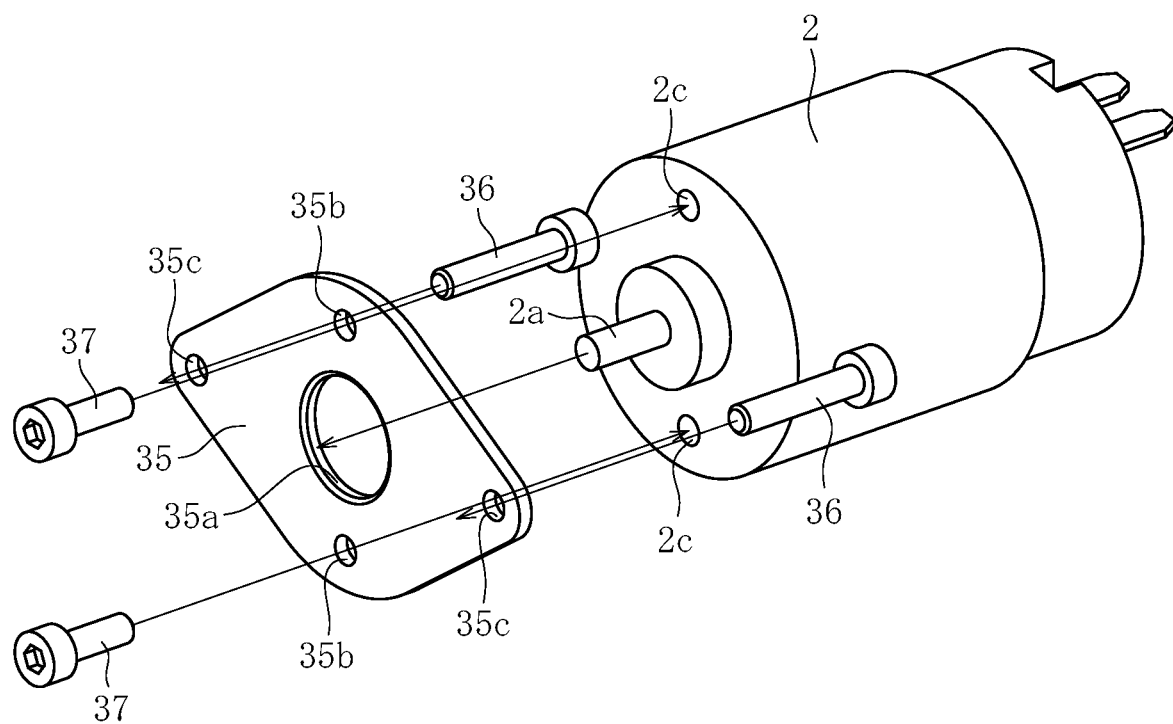
FIG. 6 is a perspective view of a method of mounting a driving motor and a stay.
Figure 7:
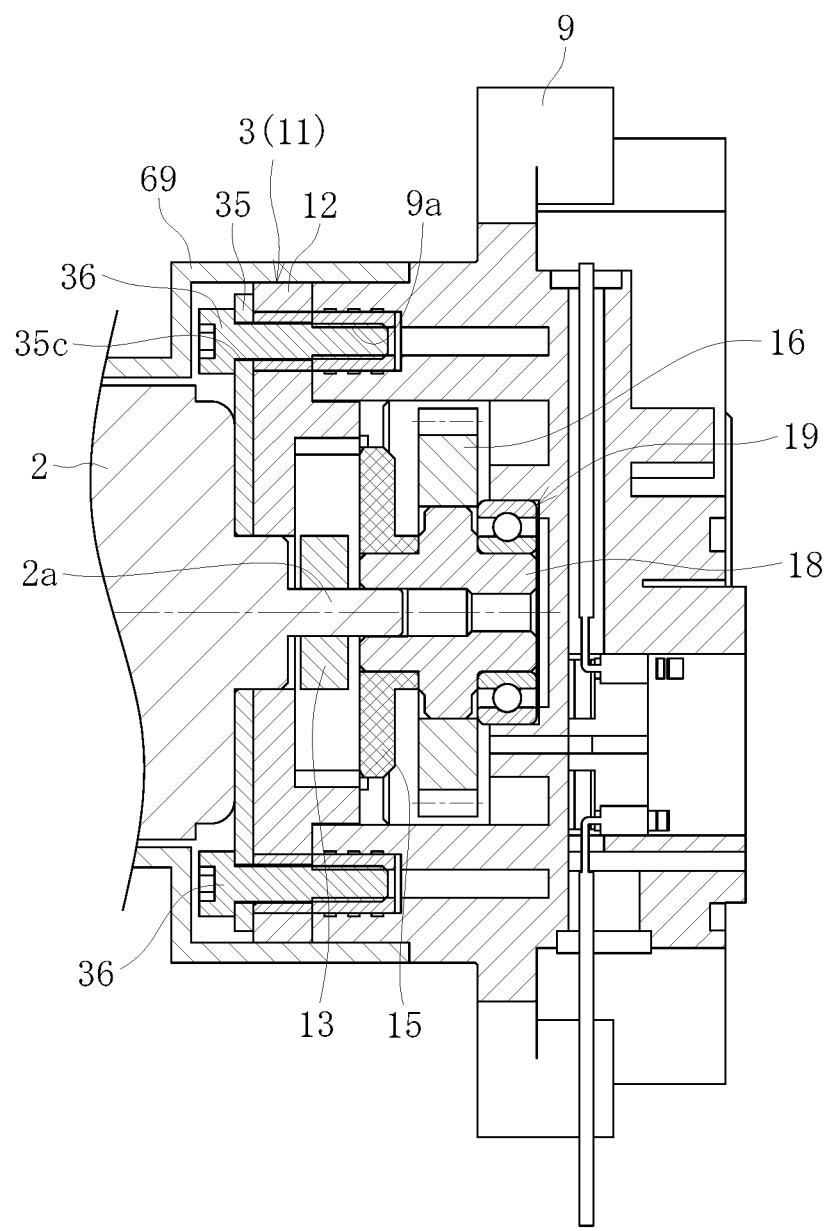
FIG. 7 is a transverse sectional view as seen in a direction indicated by the arrows of the line A-A in FIG. 1.

Specifically, as illustrated in FIG. 6, the driving motor 2 is mounted to the actuator case 9 through, first, inserting the output shaft 2*a* of the driving motor 2 into a hole portion 35*a* formed at a center of a stay 35 having a plate shape, then inserting two bolts 37 through bolt insertion holes 35*b* of the stay 35, and threadedly engaging the two bolts 37 with threaded holes 2*c* formed in the driving motor 2. As a result, the stay 35 is integrally fixed to the driving motor 2. Then, the stay 35 is fastened to the actuator case 9 through insertion of other two bolts 36 through other bolt insertion holes 35*c* formed in the stay 35 from an opposite side of the bolts 37, and threadedly engaging the bolts 36 with threaded holes 9*a* (see FIG. 2) formed in the actuator case 9. As a result, the driving motor 2 is directly mounted to the actuator case 9 without intermediation of the motor case 8. Moreover, the state in which the stay 35 is fastened to the actuator case 9 with the bolts 36 is illustrated in FIG. 7, which is a transverse sectional view as seen in a direction indicated by the arrows of the line A-A in FIG. 1.

Moreover, in this embodiment, the planetary-gear speed reduction mechanism 11 to be assembled to the drive gear 16 is also mounted to the actuator case 9 together with the driving motor 2. Specifically, the ring gear 12 is mounted to the actuator case 9 through use of the bolts 36 configured to fasten the driving motor 2 to also fasten the ring gear 12 to the actuator case 9 (see FIG. 7). Hole portions 12*a* (see FIG. 1) configured to avoid interference with the bolts 37 are formed in the ring gear 12. In the state in which the ring gear 12 is mounted to the actuator case 9, the ring gear 12 is held while the ring gear 12 is in contact with the stay 35. Through simultaneously mounting the planetary-gear speed reduction mechanism 11 to the actuator case 9 to which the driving motor 2 and the rolling bearing 19 are mounted in such a manner, the precision in the relative position there among increases, and the position and the posture of the drive gear 16 are thus precisely determined.

As described above, according to the electric actuator of this embodiment, the number of components can be reduced by omitting the bearing configured to support the drive gear, thereby being capable of achieving the cost reduction and the downsizing, and precisely holding the drive gear in position. Moreover, the electric actuator according to the present invention is not limited to the electric actuator according the embodiment, and only a necessary portion may be changed, removed, or added in such a manner as changing a size of the driving motor or a stroke length of the ball screw in accordance with an application and a specification. As a result, with the electric actuator according to the present invention, also in a case in which the electric actuator is deployed as multiple types, for example, an electric parking brake mechanism for vehicles including two-wheeled vehicles, an electric/hydraulic brake mechanism, an electric shift change mechanism, and an electric power steering as well as a 2WD/4WD electric switching mechanism and an electric shift change mechanism for an outboard engine (for a vessel propulsion engine), the low cost and the series production can be achieved.

REFERENCE SIGNS LIST 1 electric actuator
2 driving motor
2*a* output shaft 3 speed reduction mechanism
5 transmission gear mechanism
6 motion conversion mechanism
9 actuator case
11 planetary-gear speed reduction mechanism
12 ring gear
13 sun gear
14 planetary gear
15 planetary gear carrier
16 drive gear
17 driven gear
18 gear boss
18a shaft hole
19 rolling bearing

The invention claimed is:

1. An electric actuator, comprising:
a driving motor;
a motion conversion mechanism configured to convert a rotary motion of an output shaft of the driving motor to a linear motion in an axial direction parallel with the output shaft;
a transmission gear mechanism configured to transmit a driving force from the driving motor to the motion conversion mechanism; and
a speed reduction mechanism configured to reduce a speed of the rotary motion of the output shaft, and output the rotary motion reduced in speed to the transmission gear mechanism,
wherein a side of one end portion of a rotation shaft of a gear of the transmission gear mechanism is rotatably supported by a bearing, and an inner peripheral surface on a side of another end portion of the rotation shaft of the gear is rotatably supported by the output shaft of the driving motor,
wherein the speed reduction mechanism comprises a planetary-gear speed reduction mechanism comprising:
a sun gear integrally mounted to the output shaft of the driving motor;
a ring gear arranged on an outer peripheral side of the sun gear;
a plurality of planetary gears, which are arranged between the sun gear and the ring gear, and are configured to mesh with the sun gear and the ring gear; and
a planetary gear carrier, which is configured to rotatably hold the plurality of planetary gears, and is integrally mounted to an outer peripheral surface of the rotation shaft of the gear of the transmission gear mechanism, and
wherein the output shaft of the driving motor passes through the sun gear of the planetary-gear speed reduction mechanism, and is inserted into a shaft hole formed in the rotation shaft of the gear so that the output shaft is capable of rotating relative to the rotation shaft.

2. The electric actuator according to claim 1, wherein the driving motor is mounted to an actuator case to which the bearing is mounted.

3. The electric actuator according to claim 2, wherein the speed reduction mechanism is mounted together with the driving motor to the actuator case.

* * * * *